Nov. 11, 1947.   P. VAN SITTERT ET AL   2,430,486
FASTENER
Filed Oct. 15, 1943
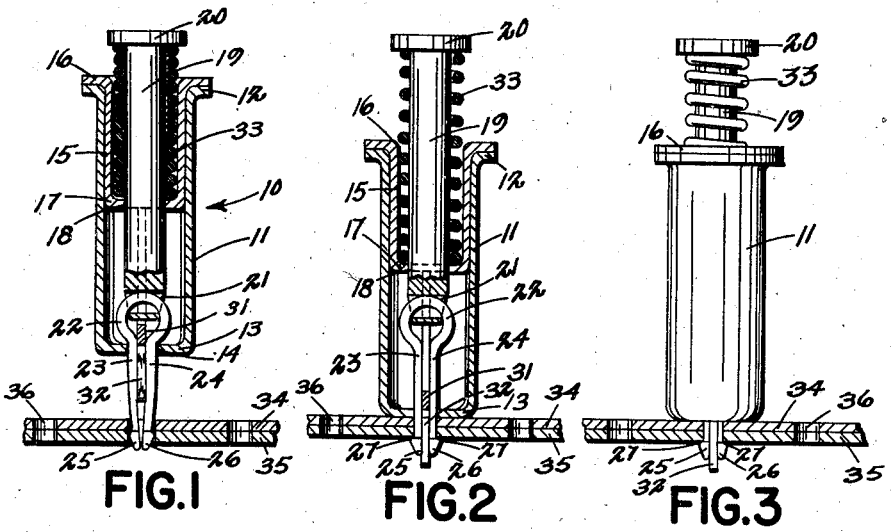
FIG.1   FIG.2   FIG.3
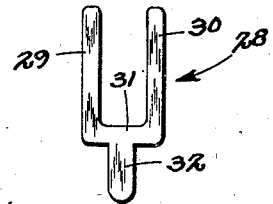
FIG.4
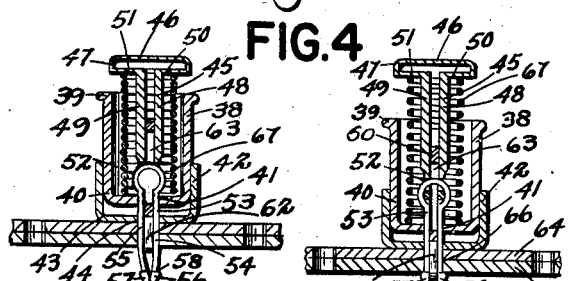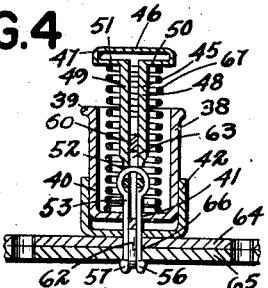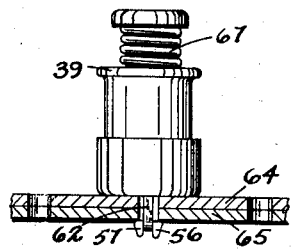
FIG.5   FIG.6   FIG.7
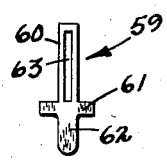
FIG.8
INVENTORS
PAUL VAN SITTERT
WILLIAM R. KOVACS
BY
ATTORNEY Patented Nov. 11, 1947

2,430,486

UNITED STATES PATENT OFFICE 2,430,486

FASTENER

Paul Van Sittert, Shaker Heights, and William R. Kovacs, Cleveland, Ohio, assignors to The Cleveland Pneumatic Tool Company, Cleveland, Ohio, a corporation of Ohio Application October 15, 1943, Serial No. 506,344

10 Claims. (Cl. 85—5)

The present invention relates to fasteners for temporarily holding together perforated plates or sheets in superposed relation preparatory to riveting or the like.

Temporary fasteners of the herein described type have become generally known in the trade as sheet holders and are usually applied to and removed from the plates or sheets by means of specially designed pliers, of a form well known in the art. While these sheet holders have been found to be highly practical in the aircraft industry, there has been a tendency in the prior art devices for certain of the parts to become broken, causing separation of the several parts of the fastener with the result that said parts will spring out of or be ejected from the sheets or pliers and thereby presenting a serious hazard to workers.

It is, therefore, the primary object of the present invention to provide a temporary fastener, the parts of which are united in a manner to substantially preclude the possibility of injury to workers should the fastener break while in use.

A further object of the invention resides in the provision of a temporary fastener including a housing having a pin movable relative thereto against the force of a spring, a retainer member and spreader therefor united with the pin in such a manner that should breakage occur on the retainer or spreader, the stem and its associated parts would be prevented from flying out of the sheets with possible injury to workers.

Other objects and advantages more or less ancillary to the foregoing reside in the specific construction and aggroupment of the elements peculiar to this structure, as will become apparent from a more complete examination of this specification.

In the drawing which illustrates the invention:

Fig. 1 is an enlarged vertical sectional view of the improved fastener illustrating the position of the several parts as it is about to be inserted in the sheets.

Fig. 2 is a view similar to Fig. 1, illustrating the fastener applied to the sheets.

Fig. 3 is a front elevational view thereof.

Fig. 4 is a side view of the spreader used with the fastener.

Fig. 5 is a vertical sectional view of a modified form of the invention, the same being shown in the position it assumes when being inserted in the sheets.

Fig. 6 is a vertical sectional view of the clamped fastener.

Fig. 7 is a front elevational view thereof.

Fig. 8 is a side view of the type of spreader used in the modified form of the invention.

Referring to the drawing for a more detailed description thereof, and particularly to the preferred form of the invention as illustrated in Figs. 1 to 4, inclusive, a temporary fastener or sheet holder embodying the features of the present invention is generally designated by the reference numeral 10 and comprises a substantially cylindrical shaped housing or body 11 formed at its upper end with an external annular flange 12, and having its lower end formed by a cross wall or base 13 having a cylindrical central bore 14 formed therein and extending therethrough. Carried by and extending within the housing 11 is a thimble shaped member 15, also formed at its upper end with an external annular flange 16 and at its lower end with a cross wall or base 17 having a cylindrical central bore 18 formed therein and extending therethrough. The bores 14 and 18 are in vertical alignment, for a purpose to be hereinafter described, and the annular flanges 12 and 16 are arranged in overlapping relation. As is understood, the thimble shaped member 15 is pressed into the member 11 with the outer wall of said member snugly engaging the inner wall of the housing 11.

Slidably mounted within the member 15 and capable of movement through the bore 18 thereof is a stem 19 formed on its outer end with a disk shaped head 20. The lower end of the pin 19 is formed with a transverse aperture 21 which forms a housing for the retainer 22, which is in the shape of a hair pin and comprises leg portions 23 and 24 which are capable of movement through the bore 14. The free ends of the leg portions 23 and 24 are formed with feet 25 and 26, respectively, which form outwardly inclined lateral projections 27 engageable with the underside of the sheets to be clamped, as will be hereinafter more fully described. The retainer 22 is preferably formed of a resilient material having a characteristic which would normally cause the ends 25 and 26 to flex toward each other, as illustrated in Fig. 1. In order to maintain said leg portions in substantially parallel relation so as to cause the lateral projections 27 to be engaged with the underside of the sheets to be clamped, there is provided a spreader best shown in Fig. 4 of the drawing and generally designated by the reference numeral 28. The spreader 28 is preferably formed of a light-weight metal and comprises parallel members 29 and 30 united by a cross member 31, the members 29, 30, and 31 presenting a substantially U-shaped construction. A tail piece 32 is integral with and extends downwardly from the cross member 31 and is adapted to be interposed between the leg portions 23 and 24 of the retainer 22 when the several parts of the fastener are assembled. The spreader 28 is positioned within the housing 11 and is disposed between the base 17 of the member 15 and the base 13 of the housing 11 with the cross member 31 resting upon the base 13 and the members 29 and 30 straddling the pin 19 and the tail portion 32 extending through the bore 14 between the leg portions 23 and 24. As is understood, the length of the members 29 and 30 of the spreader 28 is equal to the distance between the bases 13 and 17 of the housing 11 and member 15, respectively, which permits the cross member 31 to be held against the inner face of the base 13 so that the tail piece 32 will normally maintain the leg portions 23 and 24 in spaced parallel relation. While as herein specifically disclosed the retainer means of the invention comprises two parts such as the stem 19 and the hairpin retainer 22, it is obvious that in the broader aspects of the invention these parts may be combined into one integral member having an abutment at its upper end to be engaged by the spring and a pair of feet at its lower end for engagement with the lowermost surface of the sheets to be fastened together. The term "retainer means" as hereinafter employed is to be understood as covering either such a single member or the two piece means illustrated in the drawing.

Interposed between the bottom wall 17 of the member 15 and the lower face of the disk shaped member 20 is a compression spring 33 for constantly urging the stem 19 and retainer 22 upwardly. The compression of spring 33 is sufficient to urge the stem 19 upwardly a sufficient distance to bring the feet 25 and 26 of the retainer 22 against the outer face of the base 13 when the parts are in normal position.

The fastener 10 is designed to hold a pair of sheets 34 and 35 in perfect perforate alignment, the enlarged ends 25 and 26 being inserted through aligned rivet holes 36 provided through the sheets 34 and 35. The fastener 10 is ordinarily applied to and removed from the sheets by means of specially designed pliers, one jaw of the pliers being in engagement with the upper face of the disk shaped head 20 and the other jaw positioned beneath the annular flange 12 while partially encircling the cylinder 11. Upon moving the jaws of the pliers toward each other, the stem 19 and retainer 22 are moved downwardly as viewed in the drawing, projecting the leg portions 23 and 24 beyond the base 13, which position is shown in Fig. 1 of the drawing. It will be noted in this position that the enlarged ends 25 and 26 have been moved beyond the tail piece 32 and that said ends have flexed inwardly so as to be readily inserted through the rivet holes 36. This movement of the stem 19 will, of course, compress the spring 33 and as soon as the base 13 of the cylinder 11 is brought into contact with the upper face of the sheet 34, pressure on the pliers is released permitting the spring 33 to urge the stem 19 and retainer 22 upwardly until the lateral projecting portions 27 engage the underside of the sheet 35. It is, of course, to be understood that in this position the tail piece 32 has also been moved through the rivet holes 36 so as to urge the feet 25 and 26 outwardly for clamping engagement, and that the combined diameter of the leg portions 23 and 24 and the tail piece 32 is equal to or slightly less than the diameter of the holes 36. As shown in Figs. 2 and 3 of the drawing, the sheets 34 and 35 are securely clamped between the base 13 and the feet 25 and 26 by the compression of the spring 33.

In prior art devices, these fasteners have a tendency to break due to constant usage, faulty materials, or for other reasons. This breakage usually occurs on the enlarged ends of the leg portions, or occasionally the spreader will snap, permitting the leg portions to spring out of the holes 36. With the fastener applied to the sheets as illustrated in Figs. 2 and 3, such breakage would release the several parts of the device and permit the compression spring to extend to its limit with the result that the parts would fly upwardly and outwardly, presenting a serious hazard to the workmen. In such prior art devices it is customary to use retaining members having leg portions with enlarged ends separated by a spreader, but in such devices, the parts are detached and when released would, by the action of the spring, be released individually from the housing. In the present invention, however, should, for example, the enlarged ends become broken, the leg portions would be released from the rivet holes 36 and under the action of the spring 33, the stem 19 and retainer 22 would be urged away from the sheets. However, the upward travel of the stem 19 is limited due to the connection of the U-shaped retainer 22 therewith. It will be seen that the stem 19 will move upwardly until the U-shaped portion of the retainer 22 contacts the base 17 of the member 15, thus preventing the spring 33 from full expansion and thereby limiting the upward movement of the entire fastener. Since the stem 19, retainer 22, and spreader 28 are substantially united, individual separation of these parts is precluded even though the heads 25 and 26 or spreader tail piece 32 become broken.

In the modified form of the invention shown in Figs. 5 to 8, inclusive, there is provided a substantially cylindrical shaped housing or body 38 formed at its upper end with an external annular flange 39 and having its lower end formed by a cross wall or base 40 having a cylindrical central bore 41 formed therein and extending therethrough. The housing 38 has pressed on to the lower end thereof a cup-shaped member 42, which member is also formed with a cross wall or a base 43 having a cylindrical central bore 44 formed therein and extending therethrough. As best shown in Figs. 5 and 6 of the drawing, the bases 40 and 43 are arranged in spaced relation, and the respective bores 41 and 44 thereof are in vertical alignment.

Slidably mounted within the housing 38 is a stem 45, the upper end 46 thereof being disk shaped and formed with an annular flange 47. The stem 45 comprises a pair of spaced parallel walls 48 and 49 that are integral with and continuations of the inturned flanges 50 and 51 which form a part of the annular flange 47. The lower end of the stem 45 is formed with a transverse aperture 52 for engagement with the retainer 53, which construction is similar to that of the retainer and stem of the preferred form. The retainer 53 is in the shape of a hairpin and comprises leg portions 54 and 55 which are capable of movement through the central bore 44. The free ends of the leg portions are formed with feet 56 and 57, respectively, which provide outwardly inclined lateral projections 58 engageable with the underside of the sheets to be clamped. A spreader 59 is interposed between the walls 48 and 49 of the stem 45, said spreader being in the shape of a cross as best shown in Fig. 8 of the drawings and including a vertical member 60, cross member 61, and tail piece 62. In the assembly of the device, the cross member 61 is disposed between the bases 40 and 43 with the tail piece 62 depending between the legs 54 and 55 of the retainer 53. The upright member 60 is confined between the spaced walls 48 and 49 and is formed with an elongated slot 63. The stem 45, retainer 53, and spreader 59 are united through the medium of the retainer 53, it being understood that the portion of the retainer 53 which is located within the transverse aperture 52 also passes through the elongated slot 63 of the spreader 59, thereby anchoring the several parts together.

Interposed between the lower face of the disk shaped head 46 and the base 40 is a compression spring 67 for constantly urging the stem 45 and retainer 53 upwardly, as viewed in the drawing. The compression of spring 67 is sufficient to urge the stem 45 upwardly a sufficient distance to bring the feet 56 and 57 against the outer face of the base 43 when the parts are in normal position.

The modified form of fastener is applied to and removed from the pair of sheets 64 and 65 to be temporarily clamped together in the manner previously described. The legs of the retainer 53 are projected through the aligned rivet holes 66 of the sheets 64 and 65 and under the force of the spring 67 will urge the several parts upwardly until the feet 56 and 57 spaced by the tail piece 62 are brought into engagement with the underside of the sheet 65. With the fastener applied to the sheets as illustrated in Figs. 6 and 7, should the enlarged heads 56 and 57 or tail piece 62 become broken, the legs 54 and 55 may spring out of the rivet holes 66. However, due to the interlocking arrangement of the stem 45, spreader 59, and retainer 53, it will be readily apparent that these parts cannot separate so as to individually fly upwardly and away from the sheets with possible injury to workmen.

From the above description, when taken in connection with the accompanying drawing, it will be seen that in each form of the invention there has been provided a temporary fastener which contains safety features not present in the prior art devices. While in each form of the invention breakage is apt to occur so that the fastener will be released from the sheets, the construction of the several parts is such that individual separation thereof is substantially precluded, and even though the fastener itself springs away from the sheet, its movement is materially limited due to the relation of the compression spring with the several parts and will not strike a worker with sufficient force to cause serious injury.

In both forms of the invention a means is provided which is fixed in relation to the body or housing which will serve to contact the bent portion of the hairpin retainer 22 or 53, as the case may be, and stop it in the event that there should be breakage of any parts, which would tend to free the spring and permit it to expand fully. The retainer in each case being locked to the stem 19 or 45 carrying the spring abutment 20 or 46, will of course prevent the spring from expanding further. In the one case this checking of retainer movement will take place when the bent portion of the retainer 22 engages the base 17 of the thimble-shaped member 15, and in the other case the checking of retainer movement will take place when the bent portion of retainer 53 strikes the upper end of the vertical portion 60 of the spreader above slot 63. In the event that the feet 25 and 26 or 56 and 57 should break off, tending to free the spring for sudden expansion and tending thereby to discharge the stem and retainer from the body or housing, action of that kind will be prevented because the travel of the stem under the impetus of the spring will be stopped before the spring is permitted to expand much beyond the condition which it assumes normally when the device is not in use.

Although the foregoing description is necessarily of a detailed character, in order to completely set forth the invention, it is to be understood that the specific terminology is not intended to be restrictive or confining, and it is to be further understood that various rearrangements of parts and modifications of structural detail may be resorted to without departing from the scope or spirit of the invention as herein claimed.

We claim:

1. A device for temporarily clamping together perforated sheets in superposed relation comprising a body having a sheet engaging base provided with an opening, a stem movable relative to said body, the lower end of said stem being formed with a transverse aperture, a retainer carried by said stem within said aperture slidable through said opening and having feet adapted for engagement against the underside of the sheets being clamped, a spreader resting on said base for urging said feet into sheet clamping engagement, and spring means acting upon said stem for drawing said retainer inwardly of said body whereby said sheets are clamped between said base and said feet.

2. A device for temporarily clamping together perforated sheets in superposed relation comprising a body having a sheet engaging base provided with an opening, a stem movable relative to said body, the lower end of said stem being formed with a transverse aperture, a hairpin-shaped retainer mounted within the aperture of said stem having legs slidable through said opening, said legs being operable toward each other and formed with feet at the outer ends thereof adapted for engagement against the underside of the sheets being clamped, a spreader having a portion interposed between said legs, and spring means acting upon said stem for drawing said retainer inwardly of said body to urge said feet spaced by said spreader into sheet clamping engagement.

3. A device for temporarily clamping together perforated sheets in superposed relation comprising a body having a sheet engaging base provided with an opening, a stem movable relative to said body, the upper end of said stem being formed with an enlarged head and the lower end having an aperture extending transversely therethrough, a hairpin-shaped retainer carried by said stem within said aperture and having legs slidable through said opening, said legs being operable toward each other and formed with feet at the outer ends thereof adapted for engagement against the underside of the sheets being clamped, a spreader having a portion interposed between said legs, and spring means having one end engaging the enlarged end of said stem for drawing said retainer inwardly of said body to urge said feet spaced by said spreader against the underside of the sheets being clamped.

4. A device for temporarily clamping together perforated sheets in superposed relation compris- 2,430,486 ing a body having a sheet engaging base provided with an opening, a substantially cylindrically shaped member mounted within said body and having a base spaced from said sheet engaging base, said member being formed with an opening in vertical alignment with said sheet engaging base opening, a stem movable through said last mentioned opening, the lower end of said stem having an aperture extending transversely therethrough, a hairpin-shaped retainer mounted within said aperture and having legs slidable through said first opening, said legs being operable toward each other and formed with feet at the outer ends thereof adapted for engagement against the underside of the sheets being clamped, a spreader resting on the inner face of said sheet engaging base and having a portion interposed between said legs, and spring means interposed between the head of said stem and the base of said cylindrical shaped member for drawing said retainer inwardly of said body to urge said feet spaced by said spreader against the underside of the sheets being clamped.

5. A device for temporarily clamping together perforated sheets in superposed relation comprising a body having a sheet engaging base provided with an opening, a substantially cylindrically shaped member mounted within said body and having a base spaced from said sheet engaging base, said member being formed with an opening in vertical alignment with said sheet engaging base opening, a stem movable relative to said body and slidable through said second opening, the lower end of said stem having an aperture extending transversely therethrough, a hairpin-shaped retainer carried by said stem within said aperture and having legs slidable through said first opening, said legs being operable toward each other and formed with feet at the outer ends thereof adapted for engagement against the underside of the sheets being clamped, a spreader resting on the inner face of said sheet engaging base, said spreader including a pair of arms disposed on opposed sides of said stem and in abutting relation with said second base, a portion on said spreader interposed between said legs, and spring means interposed between the head of said stem and the base of said cylindrical shaped member for drawing said retainer inwardly of said body to urge said feet spaced by said spreader portion against the underside of the sheets being clamped.

6. A device for temporarily clamping together perforated sheets in superposed relation comprising a body having a base formed with an opening centrally thereof, a member carried by the lower end of said body, said member having a sheet engaging base provided with an opening in vertical alignment with said first opening, a stem movable relative to said body, said stem including a head piece having a pair of spaced parallel walls depending therefrom, the lower end of said walls having an aperture extending transversely therethrough, a hairpin-shaped retainer carried by said walls within said aperture having legs slidable through said openings, said legs being operable toward each other and formed with feet at the outer ends thereof adapted for engagement against the underside of the sheets being clamped, a spreader resting on the inner face of said sheet engaging base, a vertical member on said spreader interposed between said walls and held in position thereby, a portion on said spreader interposed between said legs, and spring means interposed between the head of said stem and the base of said body for drawing said retainer inwardly of said body to urge said feet spaced by said spreader portion against the underside of the sheets being clamped.

7. In a device of the character described, a body having a sheet engaging base provided with an opening, a stem longitudinally movable in said body having an abutment at its outer end and a transverse opening near its inner end, a spring interposed between said abutment and said base, a hairpin retainer extending through said transverse opening having legs projecting through said base opening with feet on said legs for engagement with said base or with the underside of the sheets being clamped, and serving to normally control or limit the expansion of said spring, and means fixed in relation to said body for contact with the bent portion of said hairpin retainer to stop spring expansion in the event that the said control thereof should be overcome by breakage.

8. A device for temporarily clamping together perforated sheets in superposed relation, comprising a body having a sheet engaging base provided with an opening, a substantially cylindrically shaped member mounted within said body and having a base spaced from said sheet engaging base, said member being formed with an opening in vertical alignment with said sheet engaging base opening, retainer means movable relative to said body and slidable through said aligned openings, said retainer means having an abutment at one end and comprising legs with feet at the opposite end of the retainer means adapted for engagement against the underside of the sheets being clamped, a spreader resting on the inner face of said sheet engaging base, said spreader including a pair of arms disposed on opposite sides of said retainer means extending lengthwise of the device and in abutting relation with said second base, a portion of said spreader being interposed between said legs, and spring means interposed between said abutment and said second base for drawing said feet into operative engagement with the underside of the sheets being clamped.

9. In a device of the character described, a hollow body having a sheet engaging base provided with a central opening, a substantially cylindrically shaped member mounted within said body having a base spaced from said sheet engaging base, said member being formed with a central opening in its base, a stem movable relative to said body and slidable through said second opening, the outer end of said stem having an abutment and the inner end having an aperture extending transversely therethrough, a hairpin-shaped retainer carried by said stem within said aperture and having legs slidable through said first opening, a spring interposed between said abutment and said second base, said legs being formed with feet adapted for engagement with said first base or with the underside of the sheets being clamped and serving normally to control or limit the expansion of said spring, the bent portion of said hairpin retainer being adapted to contact said second base to stop spring expansion in the event that the said control thereof should be overcome by breakage.

10. In a device of the character described, a hollow body having a base formed with an opening centrally therethrough, a member carried by the lower end of said body having a sheet engaging base spaced from said first named base provided with an opening in longitudinal alignment with said first named opening, a stem movable relative to said body, said stem including an abutment at its outer end and having a pair of spaced parallel walls the lower ends of which have an aperture extending transversely therethrough, a hairpin-shaped retainer carried by said walls within said aperture having legs slidable through said aligned openings, a spring interposed between said abutment and said first base, said legs having feet at the outer ends thereof adapted for engagement with said second base or with the underside of the sheets being clamped and serving normally to control or limit the expansion of said spring, a spreader having a cross-arm clamped between said bases and having a vertical portion interposed between said walls, said vertical portion having a slot therethrough slidably receiving the bent portion of said hairpin-shaped retainer, said bent portion being adapted to contact the vertical portion of the spreader above said slot to stop spring expansion in the event that the said control thereof should be overcome by breakage.

PAUL VAN SITTERT.
WILLIAM R. KOVACS.

REFERENCES CITED

The following references are of record in the file of this patent:

UNITED STATES PATENTS

| Number | Name | Date |
|---|---|---|
| 2,266,929 | Wallace | Dec. 23, 1941 |
| 2,354,480 | Rossmann | July 25, 1944 |
| 2,256,634 | Webb | Sept. 23, 1941 |
| 2,350,630 | Melcher | June 6, 1944 |